Patented May 22, 1934

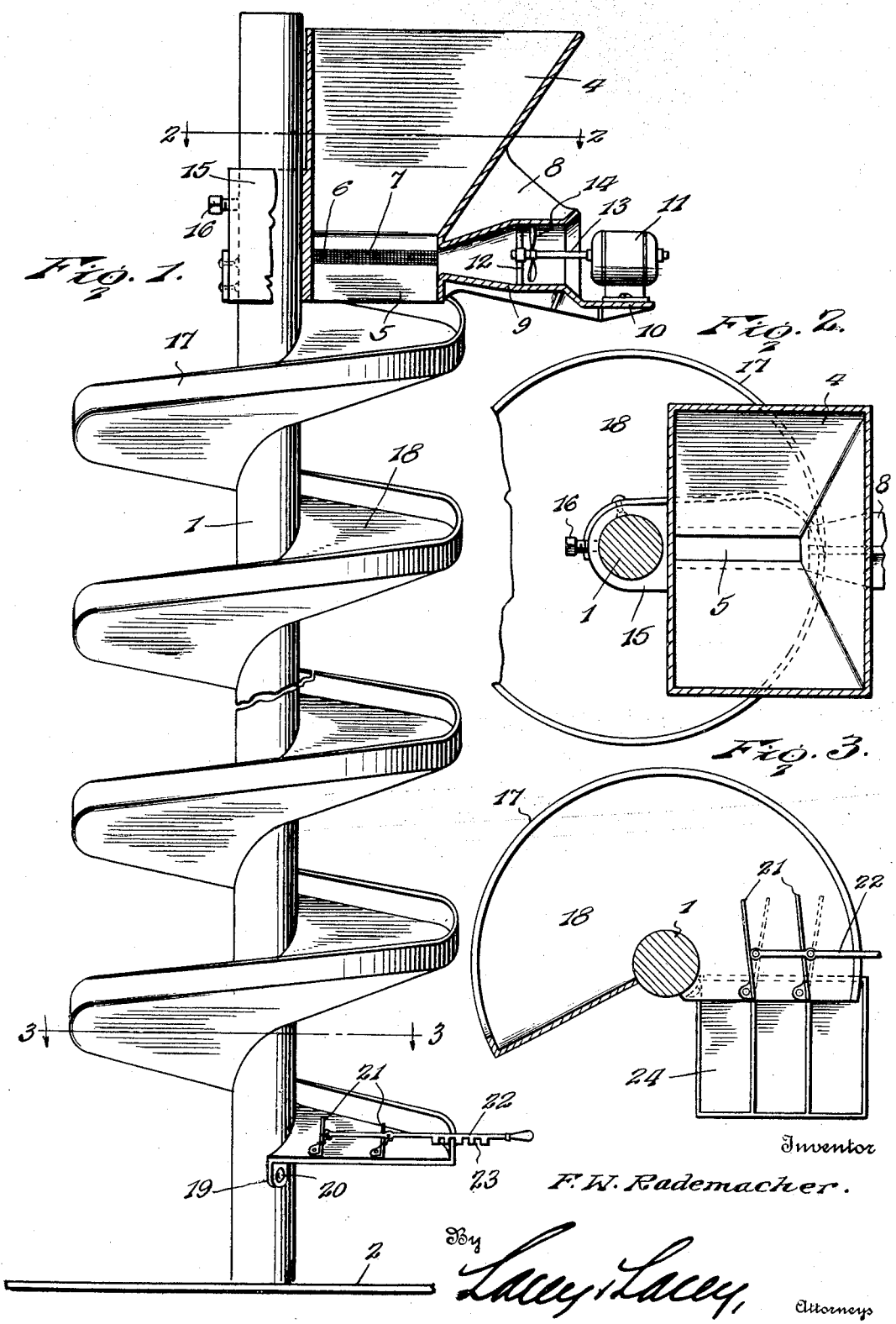

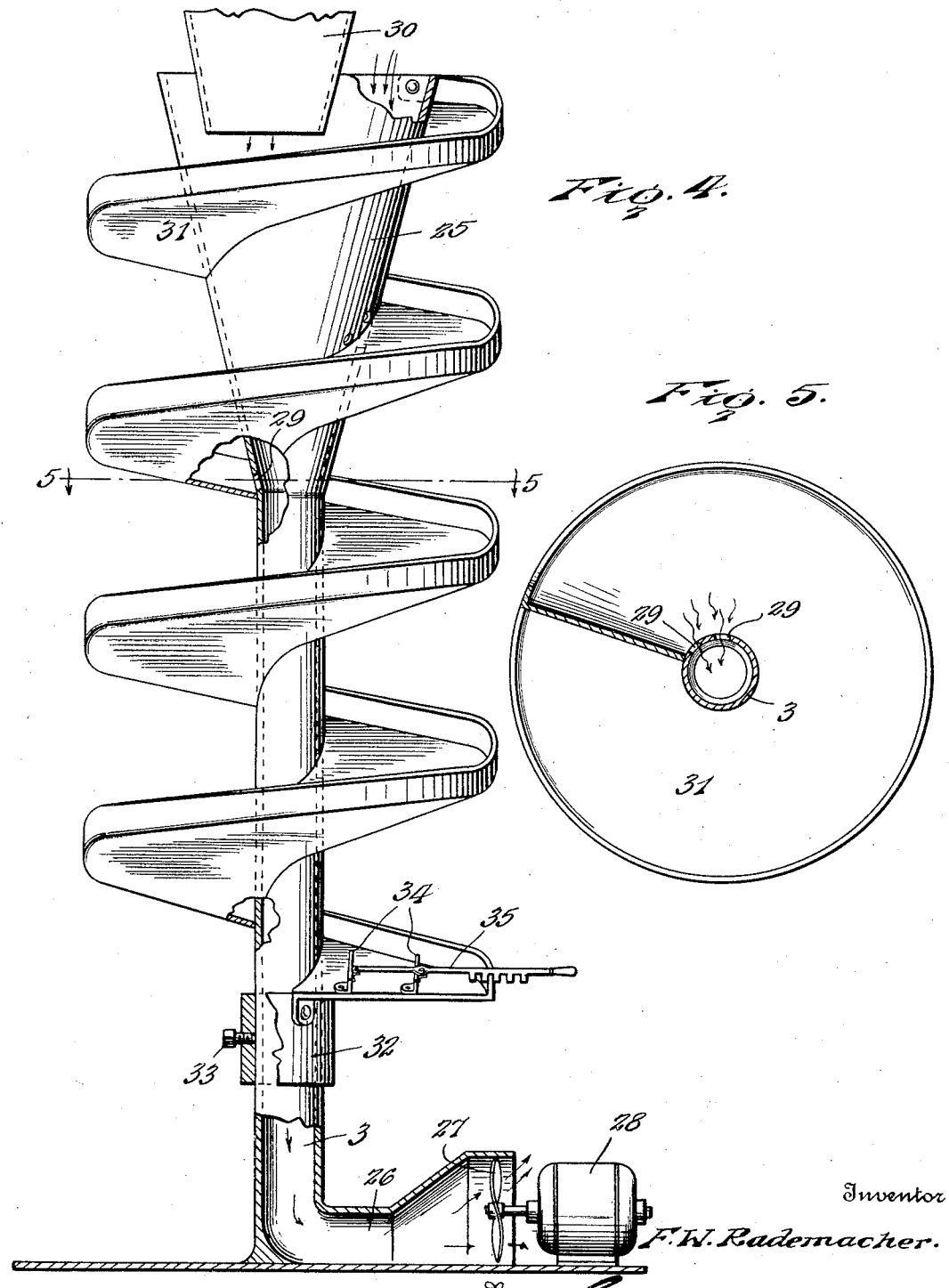

1,959,736

UNITED STATES PATENT OFFICE 1,959,736

GRAIN-GRADER AND CLEANER

Fred W. Rademacher, Kingfisher, Okla., assignor to The Rademacher Corporation, Kingfisher, Okla., a corporation of Delaware Application September 17, 1931, Serial No. 563,394

6 Claims. (Cl. 209—117)

This invention relates to means for cleaning grain and separating the lighter seeds or grains from the heavier grains and the object of the invention is to provide an inexpensive apparatus which may be easily produced and which will operate automatically and efficiently. The invention also has for its object the provision of means whereby the mixed grains, which are to be graded, may be caused to travel by gravity over a separating instrumentality and said instrumentality may be adjusted to regulate the speed of travel of the grain according to the requirements of any given circumstances. The invention is illustrated in the accompanying drawings and consists in certain novel features which will be hereinafter first fully described and then more particularly defined.

In the drawings:

Figure 1 is a sectional elevation of an apparatus embodying my invention,

Fig. 2 is a horizontal section on the line 2—2 of Fig. 1,

Fig. 3 is a horizontal section on the line 3—3 of Fig. 1,

Fig. 4 is a sectional elevation of an apparatus differing in form somewhat from that shown in Fig. 1, but operating in substantially the same manner, Fig. 5 is a horizontal section on the line 5—5 of Fig. 4.

In carrying out the present invention, there is provided a supporting standard 1 which may be connected in any desired manner with a base 2 and which is of circular cross section, said post or standard being solid in the form shown in Figs. 1, 2 and 3, while, in the form shown in Figs. 4 and 5, the post is of tubular form, as shown at 3. Referring more particularly to Figs. 1, 2 and 3, there is provided a hopper 4 which tapers downwardly and which is provided at its lower end with a narrow slot or exit 5 through which the grains pass, the side walls of said slot or exit-opening being provided with small openings 6 therethrough and having a screen, indicated at 7, secured thereover. On one side of the hopper 4, there is provided a bracket 8 having a barrel 9 formed therein which barrel communicates axially with the slot or egress-opening 5, as shown clearly in Fig. 1. The bracket 8 has an extension 10 constituting a shelf upon which may be mounted a small electric motor, indicated conventionally at 11, and within the barrel 9 is a bearing 12 in which is journaled the inner end of the motor shaft 13 and upon said shaft is secured a suction fan 14 which may be of any approved detail construction.

The hopper 4 is provided with a tubular extension or collar 15 which may encircle the post or standard 1 and is equipped with a set bolt 16 which may be turned home against the post in order to secure the hopper thereon and it will be understood that the hopper may be thereby adjusted vertically upon the post and secured in any desired position. Secured to the sleeve or collar 15, and to the lower end of the hopper, is the upper extremity of a flange 17 which is formed along the outer edge of a spiral conveyer chute or trough 18 which is constructed of resilient sheet metal and is intended to extend spirally around the post, as clearly shown in Fig. 1, the lower end of the chute or trough being open and provided with a lug 19 adapted to bear against the post and be secured thereto by a screw or bolt, as indicated at 20. Pivotally mounted upon the chute or conveyer 18, at the open lower end thereof, are gates 21 which are pivoted at the discharge edge of the chute and extend inwardly therefrom over the chute, as shown in Figs. 1 and 3. A rod or setting lever 22 is pivoted to these gates and extends laterally therefrom over the rim 17 and is provided on its underside with notches 23, any one of which may be engaged with the rim so as to hold the lever and the gates in a set position, as will be understood upon reference to Figs. 1 and 3.

The spiral conveyer having been adjusted to the desired pitch, the set bolt 16 is turned home and the mixed grains and seeds which are to be cleaned and graded are dumped into the hopper 4 and will at once flow therefrom onto the chute and then flow down the chute to the discharge end of the same. The motor 11 is energized immediately before the hopper is filled so that a blast of air will be drawn through the barrel 9 whereby the chaff and undeveloped light seeds and grains will be sucked through said openings 6 and drawn out to the open air through the barrel 9 in an obvious manner. The heavier seeds will be arrested by the screen 7 and, when dropped to the chute 18, will then flow down the same, as will be understood. When the collar or hub 15 is raised or lowered relative to the supporting post, the chute is elongated or contracted and, when it is elongated, the tilt or inclination of the chute toward the post will be increased and consequently the seeds will be caused to travel more rapidly thereover. As the seeds descend over the chute, the lighter seeds will collect around the post while the heavier seeds will acquire greater momentum and, through centrifugal action, will be caused to move toward the rim 17, the seeds being thereby automatically graded as they descend the chute. The gates 21 are set to direct the graded seeds in separate streams into any convenient receptacle placed to receive them and indicated at 24.

In the form of the invention illustrated in Figs. 4 and 5, the supporting post 3 is a tube or pipe, as has been stated, and the upper end portion of this tubular support is flared upwardly, as shown at 25, while from the lower end thereof there extends laterally a tunnel 26 in the end of which is a suction fan 27 driven by an electric motor 28. The flared upper end portion 25 of the support provides a relatively wide inlet opening for air which is drawn down through the tubular support and discharged from the tunnel 26 by the rotation of the fan 27 in an obvious manner, and at intervals in the tubular support are openings 29 through which chaff or immature seeds may be drawn to be discharged with the air-blast. A hopper 30 of any approved form is provided adjacent the upper end of the support and discharges grain onto the spiral chute 31 which passes around the support and the flared upper end 25 of the same, as shown clearly in Fig. 4, and corresponds in all essential respects to the chute or conveyer previously described. The upper end of the chute 31 is secured to the upper extremity of the support and the lower end thereof is provided with a hub collar or sleeve 32 which is secured upon the support by a set bolt 33 and may be adjusted along the same to vary the inclination of the chute, as was described in connection with the forms shown in Figs. 1, 2 and 3. Gates 34 are provided at the discharge end of the chute and are adjusted by manipulation of the hand lever 35 in the same manner as the gates 21 are adjusted.

The form of the invention shown in Figs. 4 and 5 operates essentially in the same manner as the first-described form, both forms causing the grain to gravitate over the spiral chute and be graded through centrifugal action during its travel over the chute, and both forms subjecting the flowing grain to an air-blast whereby chaff and undeveloped seeds will be separated and discharged. The apparatus will clean peas and beans of various sorts and will dry the various seeds and grains passed through it.

Having thus described the invention, I claim:

1. A grain-grader and cleaner comprising a support, and a continuous uninterrupted spiral chute of resilient material passing around the support and adjustably secured thereto at one end whereby it may be extended or contracted so as to acquire a desired tilt.

2. A grain-grader and cleaner comprising a post, a spiral chute secured upon and passing around the post, a hopper at the upper end of the chute having a discharge opening in its bottom, a barrel extending laterally from the hopper in alinement with the discharge opening and having portions passing along the sides of the hopper at the bottom of the same, the hopper being provided with minute openings in the sides of the discharge opening communicating with the barrel, and means for drawing chaff and immature seeds through the barrel.

3. A grain-grader and cleaner comprising a support, a continuous uninterrupted spiral chute of resilient material passing around the support and receiving material at its upper end, an open-ended barrel leading laterally from the chute, means for sucking chaff and immature seed through the barrel, and means for adjustably securing one end of the chute to the support whereby said chute may be extended or contracted so as to acquire the desired tilt.

4. A grain grader and cleaner comprising a support, a continuous uninterrupted spiral chute of resilient material passing around the support and adjustably secured thereto at one end whereby it may be extended or contracted to acquire the desired tilt, means for feeding material to the upper end of the chute, a plurality of gates pivotally mounted on the discharge end of the chute for directing the graded grain in discharging streams, and means for moving the gates to different positions of adjustment and holding them in adjusted position.

5. A grain grader and cleaner comprising a support, a hopper adjustably mounted for vertical movement on the upper end of the support, a suction fan communicating with the discharge end of the hopper, a continuous uninterrupted spiral chute of resilient material passing around the support beneath the hopper and rigidly secured to said hopper, and means for clamping the hopper in a set position on the support whereby the chute may be extended or contracted to acquire the desired tilt.

6. A grain grader and cleaner comprising a support, a hopper adjustable vertically of the support, a continuous uninterrupted spiral chute of resilient material passing around the support beneath the hopper and secured to and adjustable with the hopper vertically of the support, and means for holding the hopper in adjusted position.

FRED W. RADEMACHER. [L. S.]